(12) United States Patent
Chen et al.

(10) Patent No.: US 11,821,847 B2
(45) Date of Patent: Nov. 21, 2023

(54) WAFER BACKSIDE DEFECT DETECTION METHOD AND WAFER BACKSIDE DEFECT DETECTION APPARATUS

(71) Applicant: UNITED MICROELECTRONICS CORP., Hsinchu (TW)

(72) Inventors: Cheng-Hsien Chen, Yunlin County (TW); Chia-Feng Hsiao, Tainan (TW); Chung-Hsuan Wu, Tainan (TW); Chen-Hui Huang, Hsinchu (TW); Nai-Ying Lo, Kaohsiung (TW); En-Wei Tsui, Kaohsiung (TW); Yung-Yu Yang, Tainan (TW); Chen-Hsuan Hung, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 286 days.

(21) Appl. No.: 17/380,578

(22) Filed: Jul. 20, 2021

(65) Prior Publication Data
US 2023/0024259 A1 Jan. 26, 2023

(51) Int. Cl.
*G06T 7/00* (2017.01)
*G01N 21/95* (2006.01)
*G06T 7/13* (2017.01)

(52) U.S. Cl.
CPC ....... *G01N 21/9505* (2013.01); *G06T 7/0004* (2013.01); *G06T 7/13* (2017.01); *G06T 2207/30148* (2013.01)

(58) Field of Classification Search
CPC ......... H01L 21/68728; H01L 21/67051; G06F 16/5866; G06F 16/53; G01N 21/9505; G06T 7/13; G06T 7/0004; G06V 10/44
See application file for complete search history.

(56) References Cited

U.S. PATENT DOCUMENTS

| | | | |
|---|---|---|---|
| 7,733,473 B2 | 6/2010 | Yamashita et al. | |
| 7,796,801 B2* | 9/2010 | Kitamura | G06F 18/00 382/199 |
| 8,627,251 B2 | 1/2014 | Chen et al. | |
| 2005/0265595 A1* | 12/2005 | Sawa | G01B 11/028 382/286 |

* cited by examiner

*Primary Examiner* — Phuoc H Doan
(74) *Attorney, Agent, or Firm* — WPAT, P.C (57) ABSTRACT

A wafer backside defect detection method and a wafer backside defect detection apparatus are provided. The wafer backside defect detection method includes the following steps. A peripheral edge area of a wafer backside image that at least one notch is located is cropped off. Adjacent white pixels on the wafer backside image are connected to obtain a plurality of abnormal regions. If a total area of top N of the abnormal regions is more than 10% of an area of the wafer, it is deemed that the wafer has a roughness defect. N is a natural number. If the total area of the top N of the abnormal regions is less than 1% of the area of the wafer and a largest abnormal region of the abnormal regions is longer than a predetermined length, it is deemed that the wafer has a scratch defect.

20 Claims, 6 Drawing Sheets

WAFER BACKSIDE DEFECT DETECTION METHOD AND WAFER BACKSIDE DEFECT DETECTION APPARATUS

TECHNICAL FIELD

The disclosure relates in general to a defect detection method and a defect detection apparatus, and more particularly to a wafer backside defect detection method and a wafer backside defect detection apparatus.

BACKGROUND

Along with the development of semiconductor technology, various advanced manufacturing technology are invented. For example, backsides of two wafers may be bonded through the wafer-to-wafer stack technology.

During the manufacturing process, the backside of the wafer may be rubbed or scratched. If any of two wafers has a roughness defect or a scratch defect, the wafers may not be firmly bonded together.

In traditional, the wafer backside defect is detected by manpower. Therefore, the wafer backside defect and the cause factor thereof cannot be accurately detected.

SUMMARY

The disclosure is directed to a wafer backside defect detection method and a wafer backside defect detection apparatus, the wafer backside defect can be accurately detected via analyzing the abnormal regions on the wafer backside image. Furthermore, the cause factor of the wafer backside defect can be automatically analyzed according to the abnormal regions.

According to one embodiment, a wafer backside defect detection method is provided. The wafer backside defect detection method includes the following steps. At least one wafer backside image of at least one wafer is obtained. A peripheral edge area of the wafer backside image that at least one notch is located is cropped off. Adjacent white pixels on the wafer backside image are connected to obtain a plurality of abnormal regions. If a total area of top N of the abnormal regions is more than 10% of an area of the wafer, it is deemed that the wafer has a roughness defect. N is a natural number. If the total area of the top N of the abnormal regions is less than 1% of the area of the wafer and a largest abnormal region of the abnormal regions is longer than a predetermined length, it is deemed that the wafer has a scratch defect.

According to another embodiment, a wafer backside defect detection apparatus is provided. The wafer backside defect detection apparatus includes a storing unit, a cropping unit, a connecting unit and a defect determining unit. The storing unit is configured to store at least one wafer backside image of at least one wafer. The cropping unit is configured to crop off a peripheral edge area of the wafer backside image that at least one notch is located. The connecting unit is configured to connect adjacent white pixels on the wafer backside image to obtain a plurality of abnormal regions. The defect determining unit is configured to deem that the wafer has a roughness defect, if a total area of top N of the abnormal regions is more than 10% of an area of the wafer. N is a natural number. The defect determining unit is further configured to deem that the wafer has a scratch defect, if the total area of the top N of the abnormal regions is less than 1% of the area of the wafer and a largest abnormal region of the abnormal regions is longer than a predetermined length.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
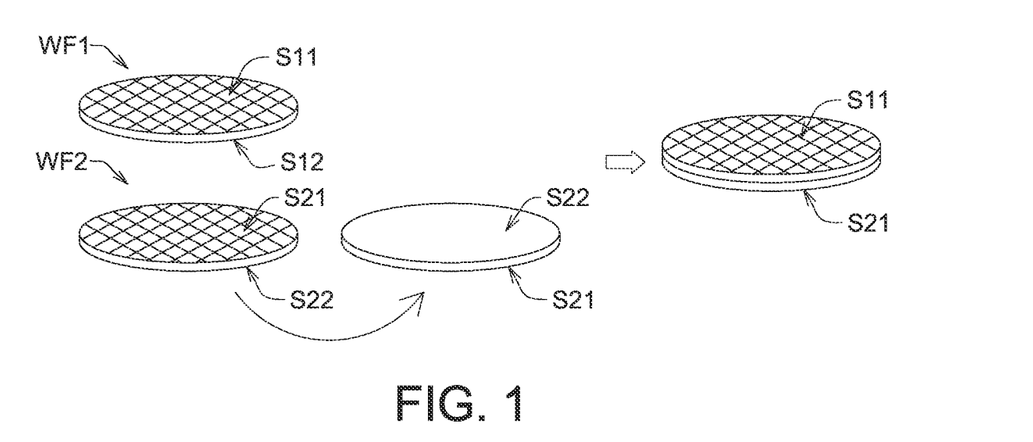
FIG. 1 illustrates the wafer-to-wafer stack technology according to one embodiment.

Please refer to FIG. 1, which illustrates the wafer-to-wafer stack technology according to one embodiment. The wafer WF1 has a top surface S11 and a bottom surface S12. The wafer WF2 has a top surface S21 and a bottom surface S22. Circuits and electric devices are formed on the top surface S11 of the wafers WF1 or the top surface S21 of the wafer WF2. The wafer WF2 is flipped and then the bottom surface S12 of the wafer W1 and the bottom surface S22 of the wafer WF2 are bonded.

Figure 2:
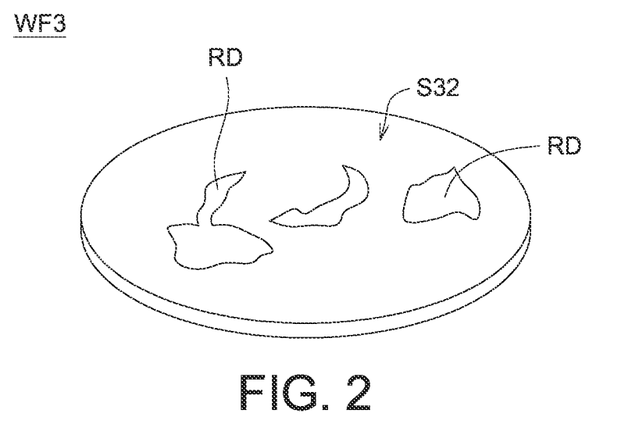
FIG. 2 shows roughness defects on a wafer according to one embodiment.

Please refer to FIG. 2, which shows roughness defects RD on a wafer WF3 according to one embodiment. The backside of the wafer WF3 may be rubbed during the manufacturing process. As shown in FIG. 2, the roughness defects RD are formed on the bottom surface S32 of the wafer WF3. Usually, the wafer WF3 is rubbed by the bearing platform, so each roughness defect RD is quite large. The unevenness of the roughness defects RD may severely reduce the bonding strength.

Figure 3:
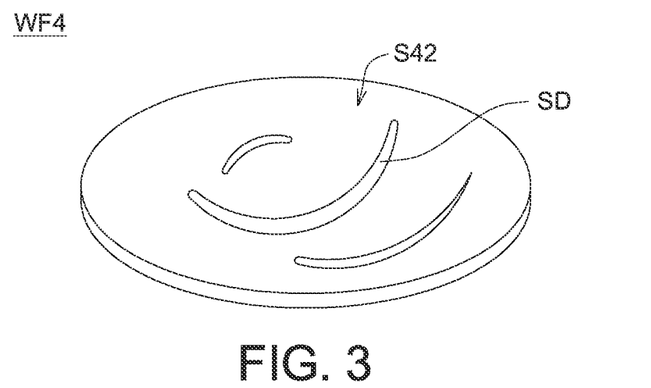
FIG. 3 shows scratch defects on a wafer according to one embodiment.

Please refer to FIG. 3, which shows scratch defects SD on a wafer WF4 according to one embodiment. As shown in FIG. 3, the scratch defects SD are formed on the bottom surface S42 of the wafer WF4. Usually, when the wafer WF4 is spinning, the wafer WF4 is easily scratched by the fixtures or particles, so each scratch defect SD is quite large. The unevenness of the scratch defects SD may severely reduce the bonding strength.

For accurately detecting the roughness defects RD and the scratch defects SD, the researchers try to apply the Robotic Process Automation (RPA) technology in the manufacturing process.

Figure 4:
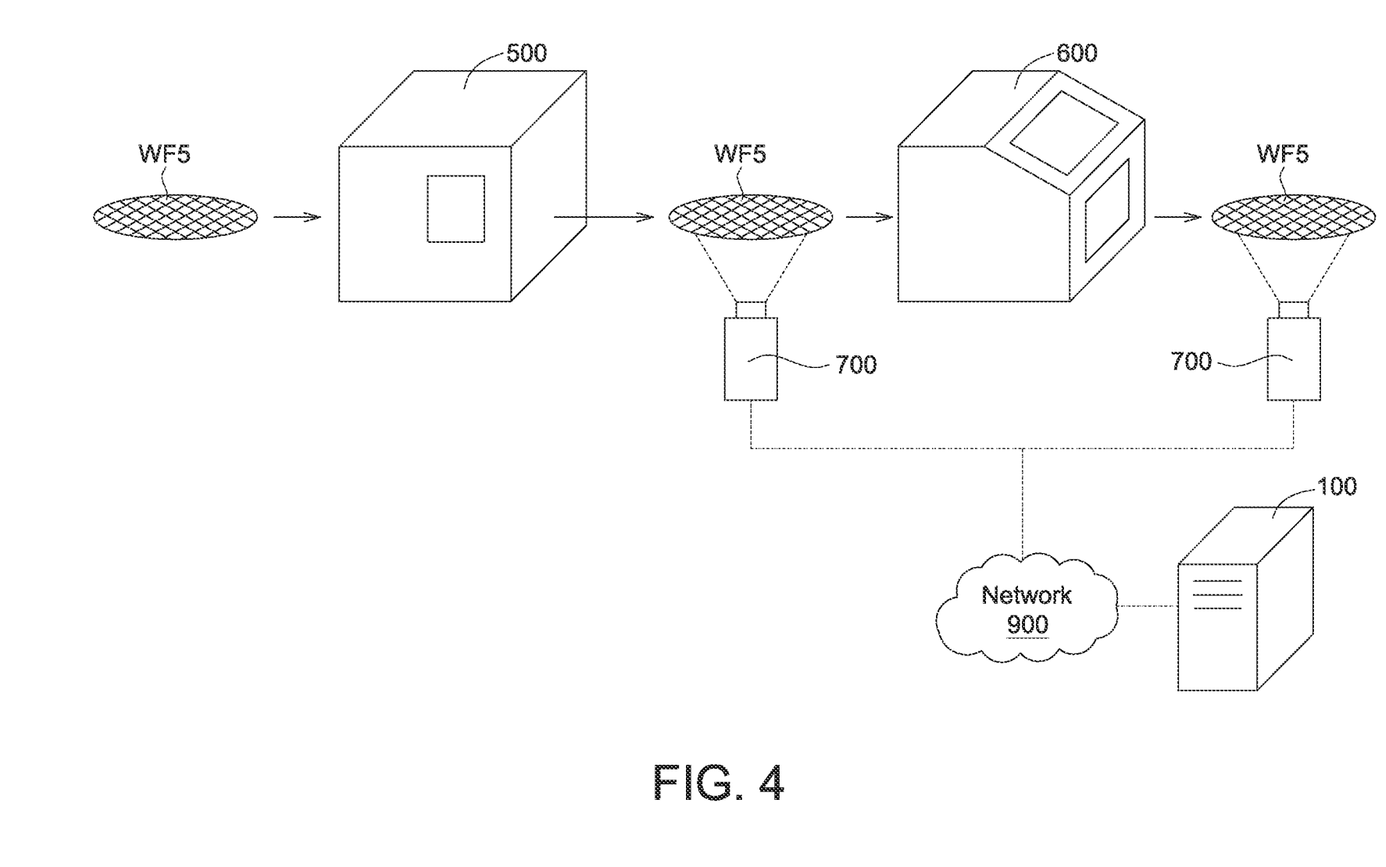
FIG. 4 illustrates the manufacturing process applied the RPA technology.

Please refer to FIG. 4, which illustrates the manufacturing process applied the RPA technology. The wafer WF5 is processed through several apparatuses 500, 600, . . . , such as etching chamber, deposition chamber, or CMP apparatus. At some of the stages, wafer backside images IM of the wafer WF5 are captured by image capturing units 700. The image capturing unit 700 is, for example, a color camera, an IR camera, or a Scanning Electron Microscope (SEM). The wafer backside images IM are transmitted to a backside defect detection apparatus 1000 via the network 900.

Figure 5:
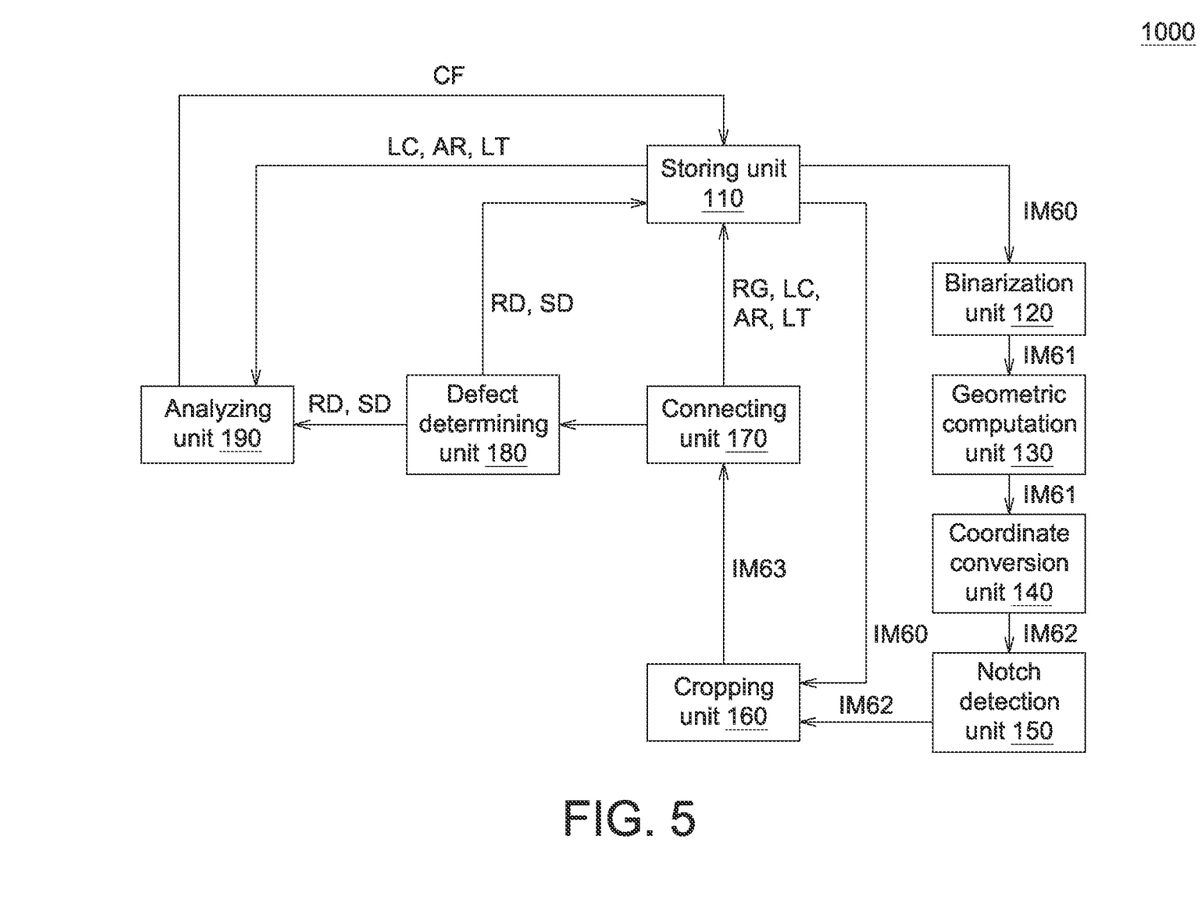
FIG. 5 shows a block diagram of the backside defect detection apparatus.

Please refer to FIG. 5, which shows a block diagram of the backside defect detection apparatus 1000. The backside defect detection apparatus 1000 includes a storing unit 110, a binarization unit 120, a geometric computation unit 130, a coordinate conversion unit 140, a notch detection unit 150, a cropping unit 160, a connecting unit 170, a defect determining unit 180 and an analyzing unit 190. The storing unit 110 is used for storing data. For example, the storing unit 110 is a memory, a disk, or a storing cloud. The binarization unit 120, the geometric computation unit 130, the coordinate conversion unit 140, the notch detection unit 150, the cropping unit 160 and the connecting unit 170 are used to perform different image processing procedures. For example, the binarization unit 120, the geometric computation unit 130, the coordinate conversion unit 140, the notch detection unit 150, the cropping unit 160 and/or the connecting unit 170 is a circuit, a chip, a circuit board, program codes or a storage device storing the program codes. The defect determining unit 180 is used to perform several determinations. The analyzing unit 190 is used to perform an analyzing procedure. For example, the defect determining unit 180 and/or the analyzing unit 190 is a circuit, a chip, a circuit board, program codes or a storage device storing the program codes.

Through the operation of those elements, the roughness defect RD, the scratch defect SD and the cause factor thereof can be accurately detected. The operation of those elements is illustrated with a flowchart.

Figure 6A:
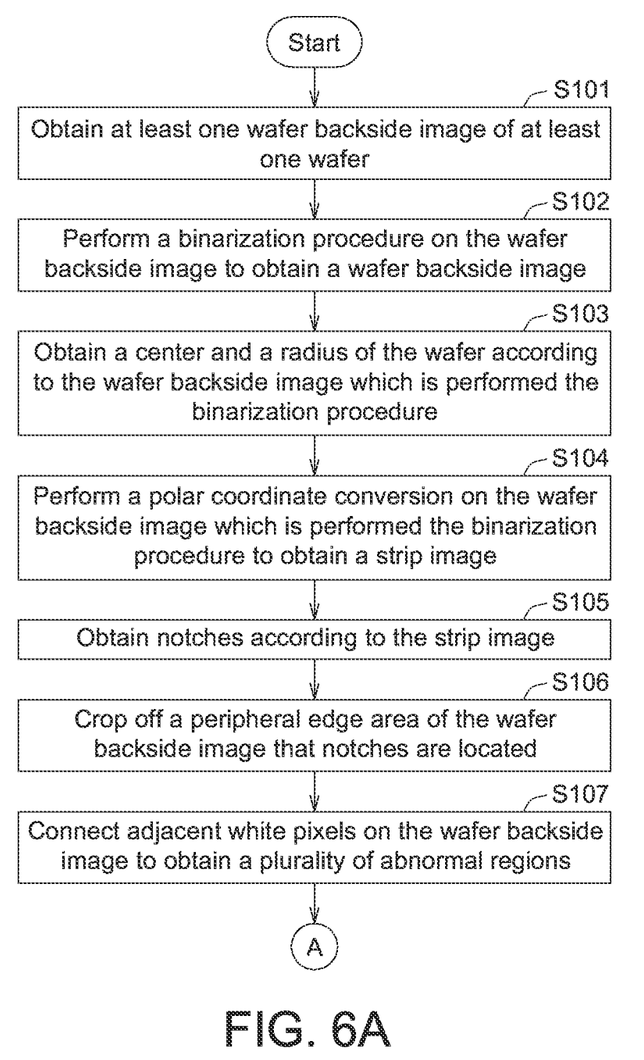
FIGS. 6A to 6B show a flowchart of a wafer backside defect detection method.
Figure 6B:
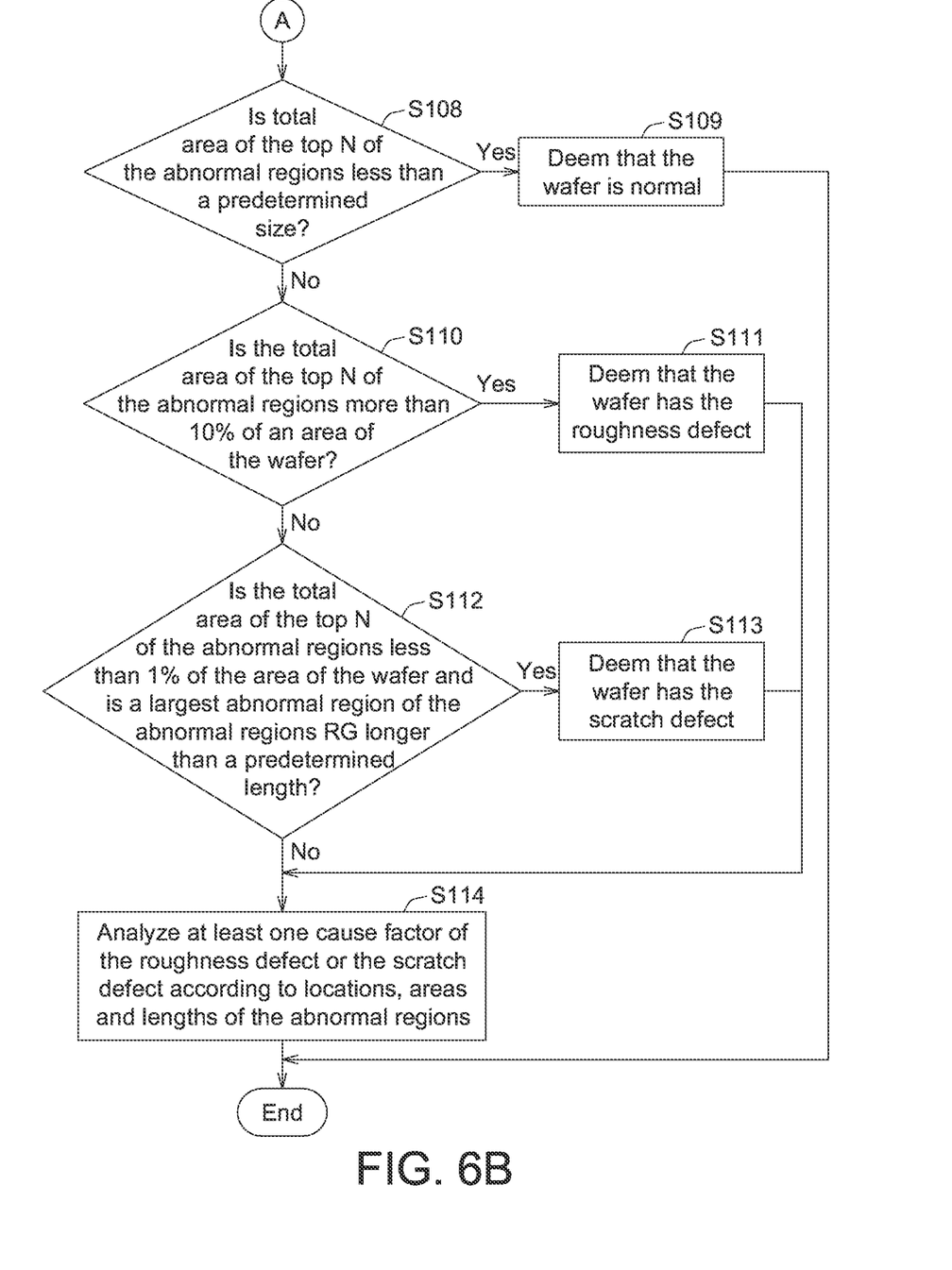
Figure 7:
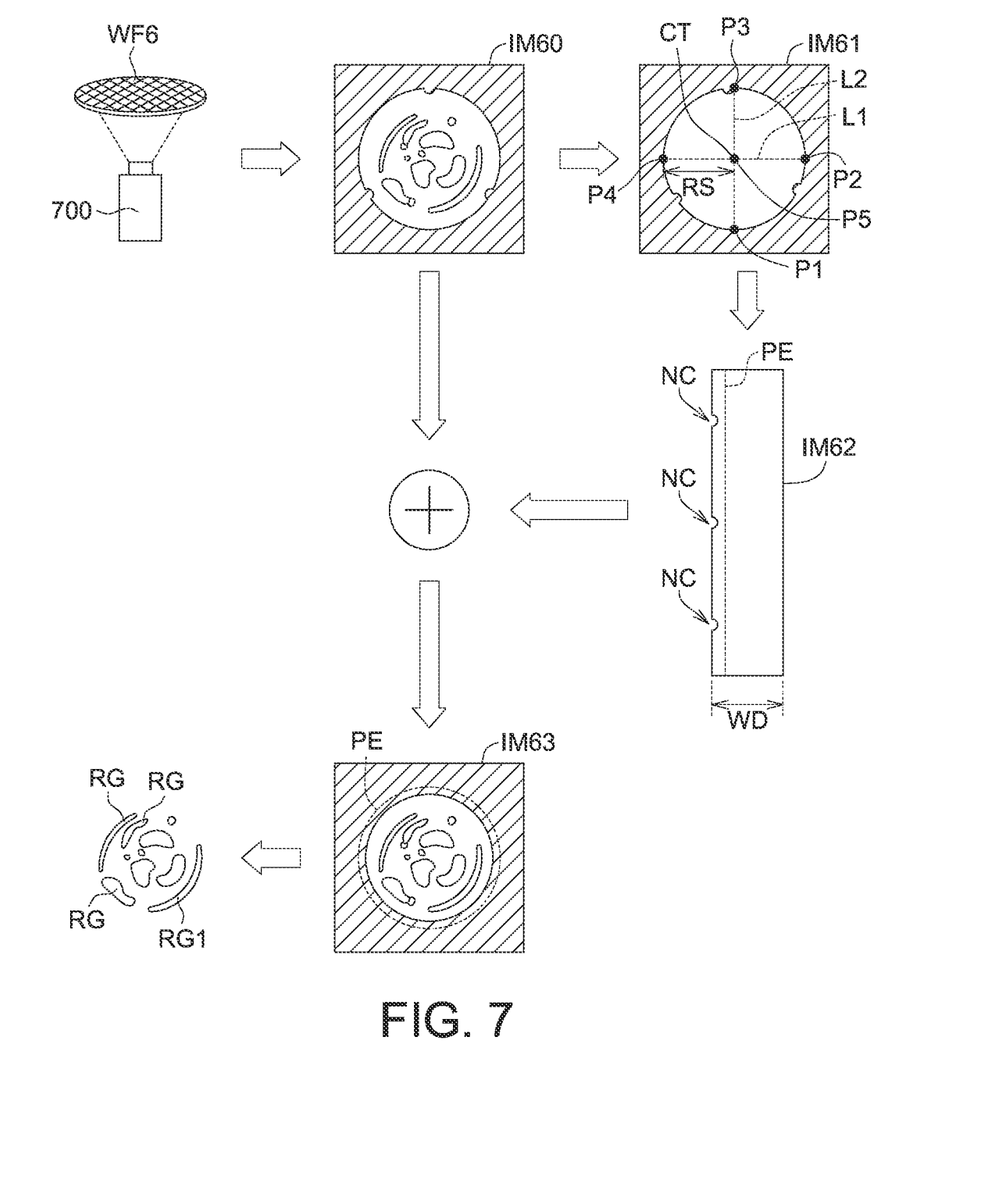
FIG. 7 shows one example illustrating the steps in FIGS. 6A to 6B.

Please refer to FIGS. 6A to 6B and FIG. 7. FIGS. 6A to 6B show a flowchart of a wafer backside defect detection method. FIG. 7 shows one example illustrating the steps in FIGS. 6A to 6B. In step S101, at least one wafer backside image IM60 of at least one wafer WF6 is obtained from the storing unit 110. The wafer backside image IM60 is captured by the image capturing unit 700 at one stage. The wafer backside image IM60 may be a color image or a greyscale image.

Then, in step S102, the binarization unit 120 performs a binarization procedure on the wafer backside image IM60 to obtain a wafer backside image IM61. In the wafer backside image IM61, the edge of the wafer WF6 is clear shown.

Next, in step S103, the geometric computation unit 130 obtains a center CT and a radius RS of the wafer WF6 according to the wafer backside image IM61 which is performed the binarization procedure. In this step, four extreme points P1, P2, P3, P4 are obtained, then a line L1 passing through the extreme point P2 and the extreme point P4 and a line L2 passing through the extreme point P1 and the extreme point P3 are obtained. The center CT is obtained at an intersection P5 of the line L1 and the line L2. The radius RS is obtained between any of the points P1, P2, P3, P4 and the center CT.

Afterwards, in step S104, the coordinate conversion unit 140 performs a polar coordinate conversion on the wafer backside image IM61 which is performed the binarization procedure to obtain a strip image IM62. The width WD of the strip image IM62 is identical to the radius RS.

Then, in step S105, the notch detection unit 150 obtains notches NC according to the strip image IM62. As shown in the strip image IM62, the notches NC are located at left side.

Next, in step S106, the cropping unit 160 crops off a peripheral edge area PE of the wafer backside image IM62 that notches NC are located. After, the peripheral edge area PE is cropped off, a wafer backside image IM63 is obtained.

Then, in step S107, the connecting unit 170 connects adjacent white pixels on the wafer backside image IM63 to obtain a plurality of abnormal regions RG.

Next, in step S108, the defect determining unit 180 determines whether total area of the top N of the abnormal regions RG is less than a predetermined size. N is a natural number. For example, N is 5, 6, or 7. The predetermined size is, for example, 900000 pixels. If the total area of the top N of the abnormal regions RG is less than the predetermined size, then the process proceeds to step S109; if the total area of the top N of the abnormal regions RG is not less than the predetermined size, then the process proceeds to step S110.

In the step S109, the defect determining unit 180 deems that the wafer WF6 is normal. That is to say, most of the abnormal regions RG are quite small, so those abnormal regions RG would not reduce the bonding strength.

In the step S110, the defect determining unit 180 determines whether the total area of the top N of the abnormal regions RG is more than 10% of an area of the wafer WF6. If the total area of the top N of the abnormal regions RG is more than 10% of an area of the wafer WF6, the process proceeds to step S111; if the total area of the top N of the abnormal regions RG is not more than 10% of an area of the wafer WF6, the process proceeds to step S112.

In the step S111, the defect determining unit 180 deems that the wafer WF6 has the roughness defect RD. That is to say, some of the abnormal regions RG are quite large, so those abnormal regions RG would reduce the bonding strength, and this wafer WF6 must be highlighted.

In the step S112, the defect determining unit 180 determines whether the total area of the top N of the abnormal regions RG is less than 1% of the area of the wafer WF6 and a largest abnormal region RG1 of the abnormal regions RG is longer than a predetermined length. For example, the predetermined length is 20 cm. In this step, the largest abnormal region RG1 is skeletonized, and then the skeleton of the largest abnormal region RG1 is measured to obtain the length of the largest abnormal region RG1.

In one embodiment, the predetermined length is set according to a distance between the largest abnormal region RG1 and the center CT of the wafer WF6. For example, if the distance between the largest abnormal region RG1 and the center CT is larger than 5 cm, the predetermined length can be set as 20 cm; if the distance between the largest abnormal region RG1 and the center CT is not larger than 5 cm, the predetermined length can be set as 10 cm.

In step S113, the defect determining unit 180 deems that the wafer WF6 has the scratch defect SD. That is to say, the wafer WF6 has at least one quite long scratch and this scratch would reduce the bonding strength, so this wafer WF6 must be highlighted.

The steps S101 to S113 may be performed on several wafers, some wafers have the roughness defect RD or the scratch defect SD can be accurately detected and highlighted.

After the roughness defect RD or the scratch defect SD is detected, the process proceeds to step S114. In the step S114, the cause analyzing unit 190 analyzes at least one cause factor CF of the roughness defect RD or the scratch defect SD according to locations LC, areas AR and lengths LT of the abnormal regions RG. The locations LC, the areas AR and the lengths LT of the abnormal regions RG are recorded in the storing unit 110.

In one embodiment, the cause analyzing unit 190 analyzes the cause factor CF according to an increment of the area AR of each of the abnormal regions RG and an increment of the length LT of each of the abnormal regions RG.

Base on above, the wafer backside defect can be accurately detected via analyzing the abnormal regions on the wafer backside image. Furthermore, the cause factor of the wafer backside defect can be automatically analyzed according to the abnormal regions.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wafer backside defect detection method, comprising:
   obtaining at least one wafer backside image of at least one wafer;
   cropping off a peripheral edge area of the wafer backside image that at least one notch is located;
   connecting adjacent white pixels on the wafer backside image to obtain a plurality of abnormal regions;
   deeming that the wafer has a roughness defect, if a total area of top N of the abnormal regions is more than 10% of an area of the wafer, N is a natural number; and
   deeming that the wafer has a scratch defect, if the total area of the top N of the abnormal regions is less than 1% of the area of the wafer and a largest abnormal region of the abnormal regions is longer than a predetermined length.

2. The wafer backside defect detection method according to claim 1, further comprising:
   performing a binarization procedure on the wafer backside image;
   obtaining a center and a radius of the wafer according to the wafer backside image which is performed the binarization procedure;
   performing a polar coordinate conversion on the wafer backside image which is performed the binarization procedure to obtain a strip image; and
   obtaining the notch according to the strip image.

3. The wafer backside defect detection method according to claim 1, further comprising:
   deeming that the wafer is normal, if the total area of the top N of the abnormal regions is less than a predetermined size.

4. The wafer backside defect detection method according to claim 3, wherein the predetermined size is 900000 pixels.

5. The wafer backside defect detection method according to claim 1, wherein locations, areas and lengths of the abnormal regions are recorded and the wafer backside defect detection method further comprises:
   analyzing at least one cause factor of the roughness defect or the scratch defect according to the locations, the areas and the lengths of the abnormal regions.

6. The wafer backside defect detection method according to claim 5, wherein the cause factor is analyzed according to an increment of the area of each of the abnormal regions and an increment of the length of each of the abnormal regions.

7. The wafer backside defect detection method according to claim 1, wherein the predetermined length is set according to a distance between the largest abnormal region and a center of the wafer.

8. The wafer backside defect detection method according to claim 1, wherein the largest abnormal region is skeletonized and then a length of the largest abnormal region which is skeletonized is detected.

9. The wafer backside defect detection method according to claim 1, wherein the predetermined length is 20 cm.

10. The wafer backside defect detection method according to claim 1, wherein N is 6.

11. A wafer backside defect detection apparatus, comprising:
    a storing unit, configured to store at least one wafer backside image of at least one wafer;
    a cropping unit, configured to crop off a peripheral edge area of the wafer backside image that at least one notch is located;
    a connecting unit, configured to connect adjacent white pixels on the wafer backside image to obtain a plurality of abnormal regions; and
    a defect determining unit, configured to deem that the wafer has a roughness defect, if a total area of top N of the abnormal regions is more than 10% of an area of the wafer, N is a natural number, and configured to deem that the wafer has a scratch defect, if the total area of the top N of the abnormal regions is less than 1% of the area of the wafer and a largest abnormal region of the abnormal regions is longer than a predetermined length.

12. The wafer backside defect detection apparatus according to claim 11, further comprising:
    a binarization unit, configured to perform a binarization procedure on the wafer backside image;
    a geometric computation unit, configured to obtain a center and a radius of the wafer according to the wafer backside image which is performed the binarization procedure;
    a coordinate conversion unit, configured to perform a polar coordinate conversion on the wafer backside image which is performed the binarization procedure to obtain a strip image; and
    a notch detection unit, configured to obtain the notch according to the strip image.

13. The wafer backside defect detection apparatus according to claim 11, wherein the defect determining unit is further configured to deem that the wafer is normal, if the total area of the top N of the abnormal regions is less than a predetermined size.

14. The wafer backside defect detection apparatus according to claim 13, wherein the predetermined size is 900000 pixels.

15. The wafer backside defect detection apparatus according to claim 11, wherein locations, areas and lengths of the abnormal regions are recorded in the storing unit, and
    wherein at least one cause factor of the roughness defect or the scratch defect are analyzed according to the locations, the areas and the lengths of the abnormal regions.

16. The wafer backside defect detection apparatus according to claim 15, wherein the cause factor is analyzed according to and an increment of the area of each of the abnormal regions and an increment of the length of each of the abnormal regions.

17. The wafer backside defect detection apparatus according to claim 11, wherein the predetermined length is set according to a distance between the largest abnormal region and a center of the wafer.

18. The wafer backside defect detection apparatus according to claim 11, wherein the largest abnormal region is skeletonized and then a length of the largest abnormal region which is skeletonized is detected.

19. The wafer backside defect detection apparatus according to claim 11, wherein the predetermined length is 20 cm.

20. The wafer backside defect detection apparatus according to claim 11, wherein N is 6.

* * * * *